May 6, 1952     F. E. STUART     2,596,082
FLOCCULATING SYSTEM
Filed July 11, 1945     2 SHEETS—SHEET 1
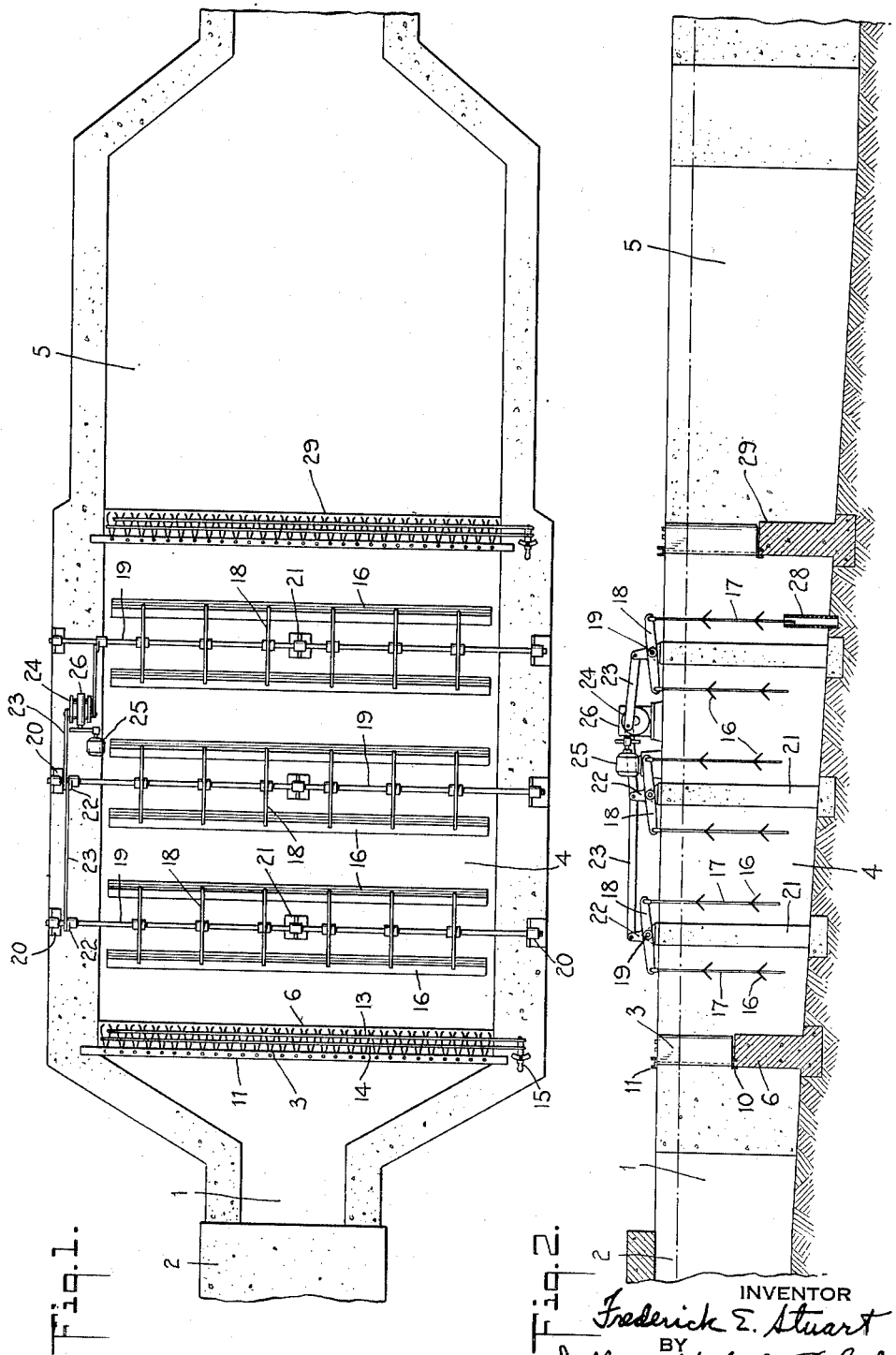
INVENTOR
Frederick E. Stuart
BY Jeffery, Kimball & Eggleton
his ATTORNEYS

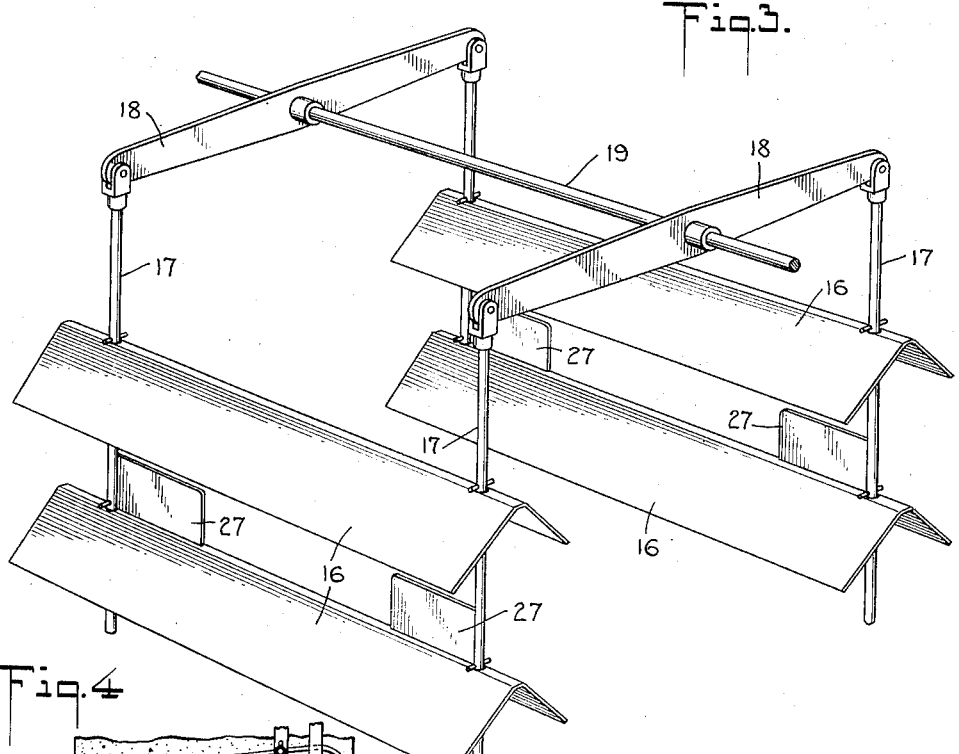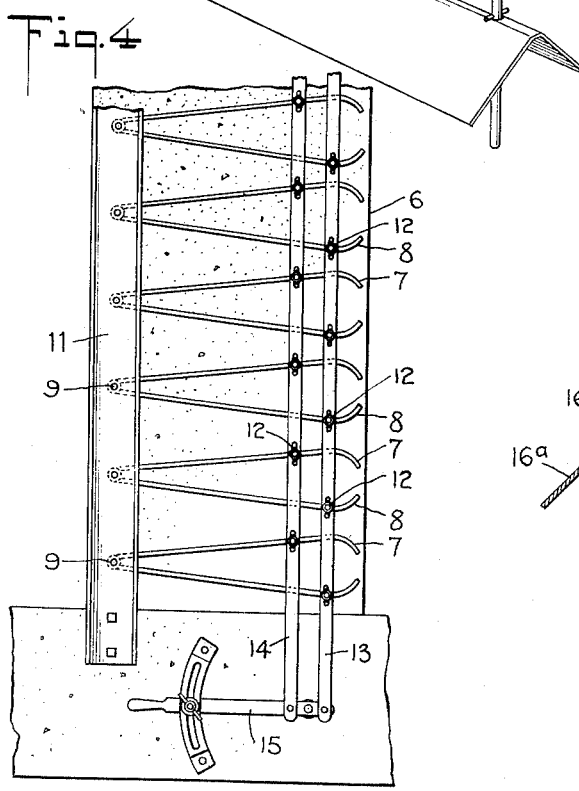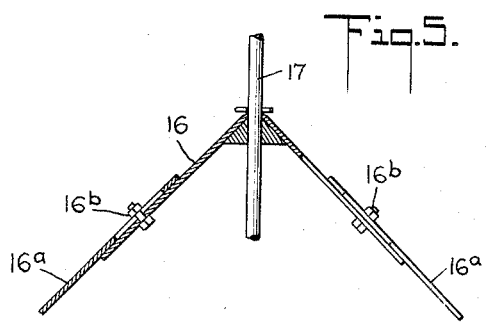

Patented May 6, 1952

2,596,082

UNITED STATES PATENT OFFICE 2,596,082

FLOCCULATING SYSTEM

Frederick E. Stuart, Baltimore, Md.

Application July 11, 1945, Serial No. 604,489

11 Claims. (Cl. 210—12)

The invention relates to flocculating systems for the purification of water, sewage, etc., and more particularly refers to means for agitating the liquid so as to cause the minute suspended solids produced or present therein to agglomerate in the form of flocks, to be then gravitationally separated so as to allow the clear liquid to pass on.

The efficiency of such systems depends on the rate at which the flocks can be made to form and grow to the size required for prompt sedimentation, because the more rapidly this occurs the larger is the volume of water that can be passed through the system in a unit of time. Flocculation is effected by agitation which however must be gentle, because if otherwise, the flocks do not form or else break apart. On this account the particular manner of agitating the liquid is an important factor and various liquid agitation schemes have been proposed and used, all intended to promote and hasten the coagulating effect.

The system herein described contemplates a different kind of agitation from that of previous systems and on comparative test has demonstrated a substantial and consistent superiority. The improvement is believed to be due, in part at least, to the creation of vertical or up and down local motions in the water while it slowly moves through the treating basin.

In the accompanying drawing which illustrates the principle just referred to:

Fig. 1 is a top diagrammatic plan of a hypothetical water-treating system using the invention.

Fig. 2 is a longitudinal section of the same.

Fig. 3 is a partial perspective of two adjacent flights of agitator vanes illustrating the preferred mechanical design and action.

Fig. 4 is a partial plan of the adjustable distributing wall.

Fig. 5 shows a vane of adjustable width.

Referring to Figs. 1 and 2, the water or liquid to be treated enters by the flume 1 from a mixing chamber 2, where it has been dosed with such chemicals as it may require to prepare it for flocculation. Such preliminary treatment is well understood in the art and therefore needs no explanation. The treated liquid passes from the flume 1 through a baffle 3 into the flocculating basin 4, under a moderate gravity head calculated to maintain a predetermined slow flow through the basin and into the settling basin 5 beyond.

The purpose of the baffle wall is to distribute the liquid entering the flocculating basin so that the flow is about the same at the sides as in the middle, or such as to assure that each unit of water experiences about the same extent of agitation in traversing the basin. Flocculating basins may be of all shapes and sizes and each may require special dispositions of flume and baffle to produce this uniformity.

Preferably this baffle wall is constituted of a continuous series of pairs of vertically hinged louvres mounted in a continuous row on top of a submerged imperforate masonry wall 6 and reaching therefrom to somewhat above the liquid level. The louvres are organized in pairs, each pair (7 and 8) forming a convergent water passage and each louvre is hinged at its entrance end on a vertical hinge rod 9, or the like, so that the water passage between louvres can be adjusted as to width. The proximate louvres of adjacent pairs are hinged to the same hinge rod 9 and all of such rods are stepped in a channel beam 10 or the like on the top of the wall 6, being supported at their upper ends in a similar beam 11, thus making a continuous wall of convergent adjustable water passages surmounting the submerged imperforate wall 6.

The advantage of pivoting the louvres is that the several water passages can be adjusted individually, in accommodation to the shape and depth of the basin, and so as to produce the required uniformity of flocculating treatment and collectively to suit the rate of flow and condition of the liquid. For this purpose the free or swinging ends of alternate louvres, viz., those marked 7, are pivotally connected at 12 to one of two parallel connecting rods, viz., the rod marked 14, while the intermediate louvres 8 are pivoted to the other connecting rod 13. Both connecting rods 13 and 14 are jointed to an adjusting lever 15 the angular movement of which moves the rods in opposite directions thereby simultaneously enlarging or restricting all the water passages by an equal amount. The individual adjustment of each water passage is accomplished by shifting the pivot connections 12 between the louvres and their respective connecting rods, which connections are made adjustable for this purpose in the manner indicated or in any suitable way.

Agitation of the liquid in the flocculating basin is produced by the action of a plurality of vertical flights of vertically reciprocating horizontal vanes 16 which flights, in the present case, are organized in pairs as presently explained and each pair may be termed a unit. The vanes in each flight are supported at appropriate intervals along their lengths by a number of suspension members or hanger-rods 17 from an over-head support by which power is applied to reciprocate the flight up and down in a substantially vertical plane and with the vanes always below the liquid level.

The vanes constituting each flight are vertically spaced apart about 3 feet, more or less, and as many of them constitute a flight as the depth of the water in the basin permits. Each vane is preferably an inverted trough, as illustrated, and desirably about two feet wide. The length of the vane depends on the length of the unit which in turn is determined by the shape of the basin in which the units are installed. The detail structure of the vanes is immaterial although their width may be adjustable as later explained.

For mechanical convenience the two adjacent flights of vanes constituting one unit are respectively suspended by their hanger rods 17, from the opposite ends of a series of rocket-levers or walking beams 18 which are fast on a horizontal rock-shaft 19 located above the liquid level. By the rocking of this shaft 19, adjacent flights are reciprocated in opposite directions, with equal stroke and equal velocity. The rock-shafts are journalled at their ends in appropriate bearings 20 placed on top of the basin side walls or on the roof of covered basins or on any appropriate number of masonry piers 21 rising from the basin bed, as may be necessary, being in any case above the liquid level, as indicated in Fig. 2, so as to be capable of efficient lubrication, clear of the basin liquid.

As many of such units are installed in the basin arranged in the appropriate positions, to suffice to treat all of the water therein, and all of the rock-shafts 19 are preferably geared together by means of their crank arms 22 and connecting rods 23, or the like, to a drive mechanism 24, driven by a motor 25, through a speed-adjusting transmission 26, thereby causing all of the units to operate simultaneously at the rate determined by the setting of such transmission. The usual setting is such as to produce a complete up and down stroke for each unit at the rate of 6 strokes per minute, more or less, the stroke being 6 feet, more or less. Means for closely varying the rate of reciprocation is important for permitting adjustment of the agitation to produce optimum flocculating results for varying liquid conditions.

Where the flights of vanes are organized on hanger-rods, like 17, pivotally suspended from the ends of walking beams, like 19, it is desirable to equip them with means to confine them to a strictly vertical motion. This can be done by equipping each flight with one or more submerged vertical fins, such as indicated at 27, the function of which is to promote a straight up and down reciprocation, little affected by the horizontal flow of the water which is relatively slow. As an equivalent to such fins the lower ends of the hanger-rods can be guided in vertical sockets mounted on the basin bed and as shown at 28 in Fig. 2.

The vanes can be made adjustable in width by affixing extension plates 16a (Fig. 5) to them by means of appropriate bolt and slot connections indicated at 16b. Such adjustment affords another means of adapting the vertical liquid movement to particular liquid conditions.

It will be observed that as a vane moves upwardly, the overlying water is caused to flow relatively downwards and divergently over its sloping top, establishing momentarily a region of slightly reduced pressure directly below or inside of it and producing what might be called a suction effect which causes the water below the vane to flow upwards following the vane, while conversely, the descent of the vane results in downward movement of the locally adjacent water which is then under some slight compression. Thus while the liquid is slowly passing through the basin, horizontally, it is subject to many localized vertical flows, by the action of the vanes working up and down below the surface.

From the flocculating basin 4 the liquid moves into the settling basin 5, under a slight gravity head, and under the control of a distributing wall indicated generally by 29 in Figs. 1 and 2, the construction of which is identical with that of the baffle 3 already described. The purpose of this wall however is to pass the flow into the settling basin in such a manner as to cause the flocks therein to settle as a sludge uniformly all over the bottom of such basin in a more or less uniform layer or bed rather than in heaps or mounds near its point of entrance. By a proper adjustment of the individual water passages of this wall the flock-bearing water from the basin 4 is admitted into the settling basin 5 at such velocities as to carry some of the flock all or most of the way toward the outlet end thereof, thereby causing the flock to settle as a substantially uniform layer all over the basin floor. This affords the practical advantage that when, so deposited, cleaning of the basin is called for at less frequent intervals.

Having once adjusted the passages to obtain such uniform deposit effect, thereafter all of them can be adjusted simultaneously, to preserve the same distribution under different working conditions, such as increased rate of flow by the simple manipulation of a louvre-adjusting lever, like 15.

It has been found desirable to curve the louvres so as to give the water-passages a general venturi curvature in horizontal section as indicated, thereby avoiding abrupt velocity changes and the formation of eddy currents which, if formed, would interfere with uniform distribution of the flocks and might disrupt them and retard sedimentation.

When sludge has sufficiently collected on the floor of the settling basin, approaching the level of the top of the imperforate wall 29, the basin is drained of liquid and the sludge removed. Only a minimum sedimentation occurs in the flocculating basin because of the vertical water movements occurring therein. The means of sludge removal can be as customary and are therefore not indicated in the drawings.

I claim:

1. In an apparatus for effecting clarification of turbid liquids, having a tank provided with an inlet at one end and with an outlet at its opposite end, the liquid to be cleared flowing from the inlet to the outlet, the combination of a plurality of paddles spaced from one another in a direction extending between opposite walls of the tank, each of said paddles extending across substantially the entire tank width in a direction substantially normal to the direction of spacing of said paddles with the end of the paddles spaced from the tank walls and free of the same, and means connected with the paddles raising and lowering the spaced paddles in alternation vertically through the flow of liquid as it moves horizontally from the inlet to the outlet of the tank.

2. In an apparatus for effecting clarification of turbid liquids, having a tank with an inlet at one end and with an outlet at its longitudinal other end, the liquid to be cleared flowing from the inlet to the outlet, the combination of a plurality of paddles transverse to the flow and spaced along the flow, supporting members for said paddles, means raising the alternate supporting members, and means lowering the other supporting members while the alternate supporting members are ascending, said paddles extending across substantially the entire width of the flow but short of said width having their ends spaced from the tank wall and free of the same, said paddles being at an angle to said supporting members.

3. In an apparatus for effecting clarification of turbid liquids, having a tank with an inlet at one end and with an outlet at its longitudinal other end, the liquid to be cleared flowing from the inlet to the outlet, the combination of a plurality of paddles transverse to the flow and spaced along the flow, supporting members for said paddles, means raising the alternate supporting members, and means lowering the other supporting members while the alternate supporting members are ascending, said paddles extending across substantially the entire width of the flow but short of said width having their ends spaced from the tank wall and free of the same, and said paddles being at an angle to said supporting members, said angle being an acute angle.

4. In an apparatus for effecting clarification of turbid liquids, having a tank with an inlet at one end and with an outlet at its longitudinal other end, the liquid to be cleared flowing from the inlet to the outlet, the combination of a plurality of paddles transverse to the flow and spaced along the flow, supporting members for said paddles, means raising the alternate supporting members, and means lowering the other supporting members while the alternate supporting members are ascending, said paddles extending across substantially the entire width of the flow but short of said width having their ends spaced from the tank wall and free of the same, said paddles being at an angle to said supporting members, said angle being an obtuse angle.

5. In an apparatus for effecting clarification of turbid liquids, a tank with an inlet at one end and with an outlet at its longitudinal other end, the liquid to be cleared flowing from the inlet to the outlet, a plurality of paddles spaced along the length of the tank, each extending across substantially the entire width of the tank but short of the side walls thereof, and means raising and lowering the spaced paddles in alternation, vertically through the flow.

6. In a flocculating system, a mixing chamber, a flocculating basin having an inlet from said chamber to receive treated liquid from said chamber and an outlet for the liquid, a plurality of vertical flights of horizontal vanes in the form of inverted troughs, and extending substantially transversely across the path of flow of liquid from said inlet to said outlet, suspension means for supporting the vanes of said flights below the level of said liquid in the basin, and driving mechanism to reciprocate the flights substantially vertically in the liquid and at a rate to agglomerate fine solids suspended in the liquid.

7. In a flocculating system, a mixing chamber, a flocculating basin having an inlet from said chamber to receive treated liquid from said chamber and an outlet for the liquid, a plurality of vertical flights of horizontal vanes provided with adjustable extension means whereby the effective width thereof can be changed, each extending substantially transversely across the path of flow of liquid from said inlet to said outlet, suspension means for supporting the vanes of said flights below the level of said liquid in the basin, and driving mechanism to reciprocate the flights substantially vertically in the liquid and at a rate to agglomerate fine solids suspended in the liqiud.

8. In a flocculating system, a mixing chamber, a flocculating basin having an inlet from said chamber to receive treated liquid from said chamber and an outlet for the liquid, a plurality of vertical flights of horizontal vanes, each extending substantially transversely across the path of flow of liquid from said inlet to said outlet, suspension means for supporting the vanes of said flights below the level of said liquid in the basin, and driving mechanism to reciprocate the flights substantially vertically in the liquid and at a rate to agglomerate fine solids suspended in the liquid, the said system being characterized by the suspension means of the flights being pivotally jointed for the means reciprocating them and being provided with vertical vanes to hold the flight to straight line motion.

9. A flocculating system comprising a flocculating basin discharging into a settling basin through a flock-distributing wall, said wall comprising a submerged substantially imperforate wall and a series of pairs of vertically hinged louvres surmounting said wall and forming a plurality of water passages, and vertically reciprocating vanes in said flocculating basin adapted to create up and down water currents therein.

10. A system as in claim 9 wherein the louvres are collectively adjustable.

11. In a flocculating system, means for distributing the liquid flow comprising a submerged imperforate wall and a series of pairs of vertically hinged louvres mounted thereon and forming a plurality of water passages, means for collectively adjusting the louvres to vary the water passages, and means for individually adjusting said louvres.

FREDERICK E. STUART.

REFERENCES CITED

The following references are of record in the file of this patent:

UNITED STATES PATENTS

| Number | Name | Date |
|---|---|---|
| 37,730 | Bottum | Feb. 24, 1863 |
| 79,491 | Miller | Jan. 30, 1868 |
| 399,610 | Goss | Mar. 12, 1889 |
| 801,330 | Moore | Oct. 10, 1905 |
| 1,778,326 | Kutzer | Oct. 14, 1930 |
| 1,893,451 | Smith | Jan. 3, 1933 |
| 1,997,161 | Weber | Apr. 9, 1935 |
| 2,089,160 | Darby | Aug. 3, 1937 |
| 2,101,810 | Fischer | Dec. 7, 1937 |
| 2,108,021 | Russell | Feb. 8, 1938 |
| 2,118,157 | Camp | May 24, 1938 |
| 2,128,569 | Velz | Aug. 30, 1938 |
| 2,160,836 | Dorr | June 6, 1939 |
| 2,281,826 | Camp | May 5, 1942 |
| 2,320,007 | Otto | May 25, 1943 |
| 2,369,194 | Weber | Feb. 13, 1945 |
| 2,422,555 | Karlson et al. | June 17, 1947 |

FOREIGN PATENTS

| Number | Country | Date |
|---|---|---|
| 435,862 | Great Britain | Sept. 23, 1935 |
| 458,318 | Great Britain | Dec. 17, 1936 |
| 483,380 | Germany | Sept. 28, 1929 |
| 553,259 | Germany | June 24, 1932 |
| 569,227 | France | Apr. 9, 1924 |